United States Patent [19]

Weidner et al.

[11] Patent Number: 5,697,437
[45] Date of Patent: Dec. 16, 1997

[54] SYSTEM FOR THE REMOVAL OF CONTAMINANT SOIL-GAS VAPORS

[75] Inventors: Jerry R. Weidner, Iona; Wayne C. Downs, Sugar City; Timothy G. Kaser, Ammon; H. James Hall, Idaho Falls, all of Id.

[73] Assignee: Lockheed Idaho Technologies Company, Idaho, Id.

[21] Appl. No.: 569,045

[22] Filed: Dec. 7, 1995

[51] Int. Cl.⁶ .............. B09C 1/00; E21B 34/02; E21B 43/18
[52] U.S. Cl. .............. 166/52; 166/268; 166/325; 166/370; 405/128
[58] Field of Search .............. 166/52, 268, 325, 166/326, 369, 370; 405/128; 588/261

[56] References Cited

U.S. PATENT DOCUMENTS

| | | | |
|---|---|---|---|
| Re. 33,102 | 10/1989 | Visser et al. | 166/370 X |
| 4,745,850 | 5/1988 | Bastien et al. | 405/128 X |
| 4,832,122 | 5/1989 | Corey et al. | 166/52 X |
| 4,895,085 | 1/1990 | Chips | 405/128 X |
| 5,017,289 | 5/1991 | Ely et al. | 405/125 X |
| 5,220,958 | 6/1993 | Bernhardt | 166/370 X |
| 5,288,169 | 2/1994 | Neeper | 405/128 |
| 5,445,474 | 8/1995 | Lundegard et al. | 405/128 |
| 5,553,974 | 9/1996 | Nazarian | 405/128 |

OTHER PUBLICATIONS

Foor, Dean C., *Passive Bioventing Driven by Natural Air Exchange*, Proceedings of the Petroleum Hydrocarbons and Organic Chemicals in Ground Water, Houston, Texas, Nov. 15–17, 1993, pp. 305–309.

*Primary Examiner*—George A. Suchfield
*Attorney, Agent, or Firm*—Alan D. Kirsch

[57] ABSTRACT

A system extracts contaminated vapors from soil or other subsurface regions by using changes in barometric pressure to operate sensitive check valves that control air entry and removal from wells in the ground. The system creates an efficient subterranean flow of air through a contaminated soil plume and causes final extraction of the contaminants from the soil to ambient air above ground without any external energy sources.

21 Claims, 4 Drawing Sheets

SYSTEM FOR THE REMOVAL OF CONTAMINANT SOIL-GAS VAPORS

CONTRACTUAL ORIGIN OF THE INVENTION

The United States Government has rights in this invention pursuant to Contract No. DE-AC07-76ID01570 between the United States Department of Energy and Lockheed Idaho Technologies Company.

TECHNICAL FIELD

This invention relates in general to withdrawing contaminant vapors from the soil or other subsurface regions and, more specifically, to a system that utilizes changes in barometric pressure for controlling sensitive check valves to withdraw the contaminant vapors.

BACKGROUND OF THE INVENTION

Many areas in the United States and other countries have soils contaminated with hazardous volatile organic compounds (VOC's). Examples of such areas include underground fuel storage areas, industrial complexes, airports, laboratories, etc. Volatile cleaning agents, such as carbon tetrachloride, are also contaminating many sites—some of which have been abandoned. In addition, over the last seventy or so years, many thousands of gallons of fuel have leaked into the soils in these areas.

One of the primary technologies used to clean such contaminated sites is soil washing, which includes excavating the contaminated soil, processing it, and then returning it to the site. However, obviously, this technique can be quite costly and labor intensive to accomplish. Another conventional cleaning technology is vacuum extraction, which is an in situ procedure where motor driven vacuum pumps extract the contaminated soil-gases. Under vacuum extraction methods, however, in locations where the contaminated soils may be almost impermeable, conventional high velocity pumps consume significant amounts of energy without extracting significant amounts of VOC's.

Accordingly, objects of the present invention are to provide an automated, efficient, soil cleaning system that is low cost, that requires no man-made energy input, and that can operate unattended for long periods of time.

SUMMARY OF THE INVENTION

According to principles of the present invention in a preferred embodiment, natural barometric pressure changes are tapped to activate sensitive check valves for controlling air injection into and extraction from contaminated underground soils. The system comprises multiple wells penetrating an underground contaminated soil zone. An injection well includes a first check valve that opens during higher ambient air barometric pressures to admit air into the soil. An extraction well includes a second check valve which closes in response to the higher barometric pressure change. When the pressure in the wells exceeds the ambient air pressure above ground, the first injection well check valve closes, stopping air injection, and the second extraction well check valve opens, exhausting contaminated air to the atmosphere. All check valves work simply by barometric changes without need for any separate energy requirements.

As an optional application, the wells may exist independently or be independently operated (namely, injection well(s) without extraction well(s) or vice versa), since experiments have shown that either extraction or injection wells can operate effectively without the other part of the system.

In fact, they have different but complimentary functions. For example, the extraction well removes the contaminant gases from the subsurface, regardless of the injection well operation. In contrast, the purpose of the injection well is to control the subsurface shape and movement of the contaminant gas plume, and does so regardless of the operation of the extraction wells.

Because of the extreme differential pressure sensitivity of the check valves, i.e. about 0.06 millibar, the valves may cycle open and shut hundreds of times in a day and, consequently, exhaust hundreds of cubic feet of air containing volatile compounds, without using any undesirable man-made energy sources. In a preferred embodiment, the unique, sensitive check valves have only one moving part. Namely, a plastic diaphragm is actuated to a closed position by gravity and to an opened position by barometric pressure. Optionally, the system uses wind turbines at the heads of the wells to increase air flow.

Advantageously, this system operates using the natural fluctuation of barometric pressure as the energy source for controlling air injection and extraction. Furthermore, a low velocity air movement is provided, as opposed to conventional motor pumping systems, that more closely matches the evaporation rate of subsurface volatile compounds. Other objects, advantages, and capabilities of the present invention will become more apparent as the description proceeds.

DETAILED DESCRIPTION OF THE INVENTION

Figure 1:
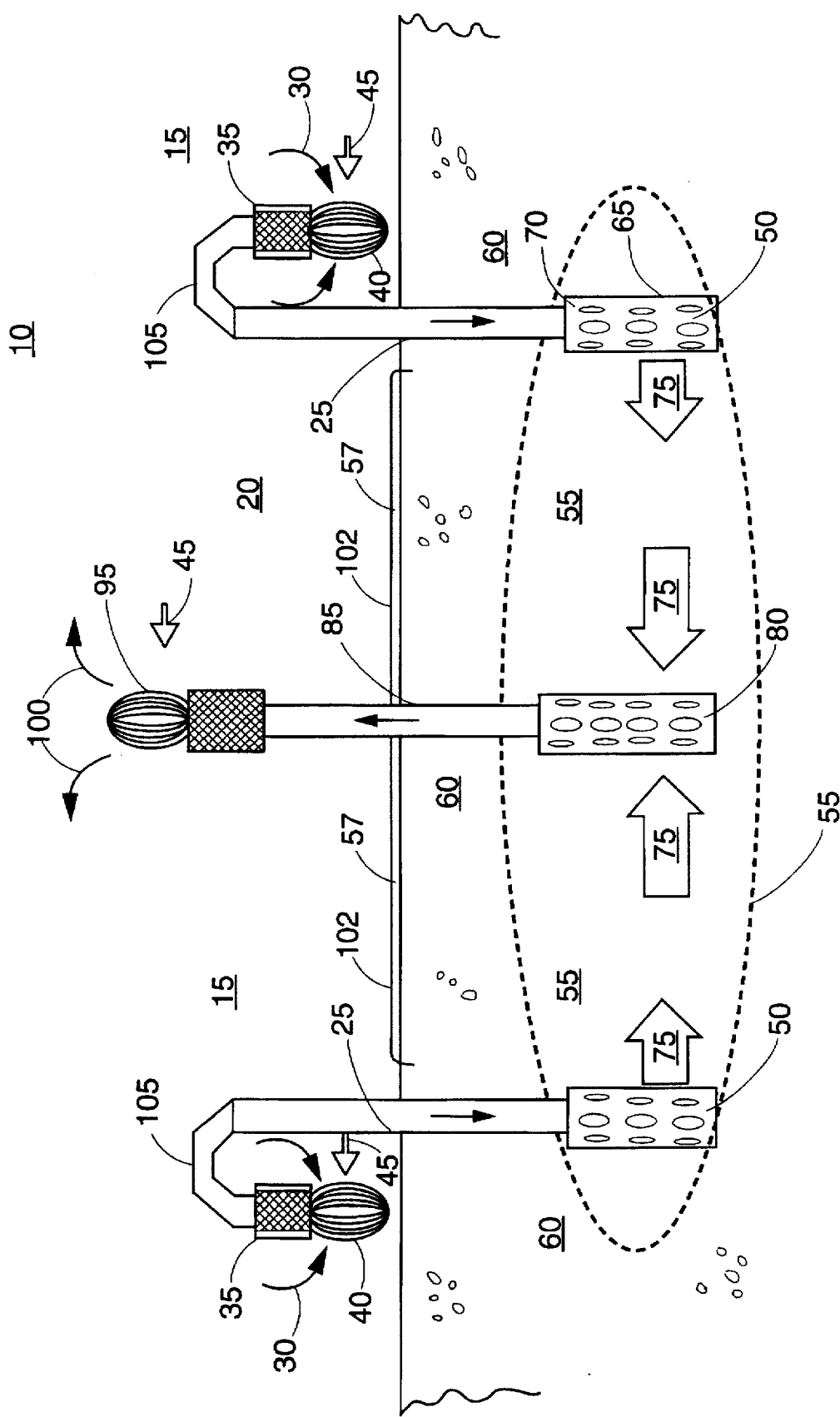
FIG. 1 is a schematic cross section view of the present invention soil gas vapor removal system.

FIG. 1 illustrates the present invention system, generally indicated at 10, for removal of contaminant soil gas vapors. In the embodiment shown, there are two injection wells 15, and one extraction well 20. Injection wells 15 include injection lift check valves 35 which allow air 30 to enter conduits 25 during higher barometric pressures and, conversely, prevent air inflow during lower barometric pressures. When check valves 35 are open, the air-in flow rate can be increased (in windy areas), optionally, by the use of conventional air injection wind turbines 40. The wind turbines rotate, regardless of wind direction, during higher wind conditions to pump or blow air down conduits 25. Wind air flow is shown at directional arrows 45. Such wind turbines can generate air flows in excess of 900 cubic feet per minute (cfm) in a 15 mph wind, dependent on system discharge pressure.

Injection or extraction air flow can be increased even further if a conventional wind turbine is modified to drive a secondary air pump, such as a squirrel cage rotor or even a positive displacement pump. In the case of the injection well, a secondary pump is required because a commercial wind turbine does not work well if there is a back pressure in the well, requiring air compression. The use of these types of secondary air pump turbines will improve overall efficiency while keeping the system low cost and energy free.

Conduits 25 terminate in perforated cylinders 50 within contaminated (production) zone (plume) 55 below ground level 57. Some of the air within injection conduits 25 exits the perforated cylinders 50 and flows, as at 75, towards extraction well 20 into underground perforated extraction cylinder 80.

In cases where the ground strata 60 is stable, conduits 25 and perforated cylinders 50 are not needed, and the injection air may simply enter a bore hole in the soil 60 and 55. In the event that bore holes are used without conduits 25, the air can be selectively directed into contaminated zone 55 by means of inflatable balloon devices, conventionally called straddle packers, that are strategically disposed in the bore hole. For example, an open straddle packer could be placed in the bore hole at location 65, and a closed one at location 70.

Extraction well 20 includes extraction conduit 85 in unstable soils (a mere bore hole in stable soils), extraction lift check valve 90, and optional extraction wind turbine 95 which would increase extraction air flow as shown at arrow 100.

In the case where the ground is unstable and highly permeable, and the wells are shallow, the use of a temporary, impermeable barrier 102 will improve the air extraction efficiency. The impermeable barrier 102 is deployed on the ground surface in such a way that the extraction well (or injection well) would be surrounded on all sides by such an impermeable barrier. Many materials could be used to produce this barrier including a thin plastic sheet, a layer of asphalt, concrete, or a clay, such as bentonite.

The need for such an impermeable barrier arises when the pressure differential is small—too small for maximum air flow due to barometric changes. The application of a temporary impermeable barrier 102 as described and shown on FIGS. 1 and 4, greatly increases the air path length and pressure differential from subsurface to ground surface, thus causing the well to be the path of least resistance and region of maximum air flow.

As indicated, system 10 operates as a result of barometric pressure increases and decreases. When ambient air pressure (above ground) exceeds well pressures, injection well check valves 35 open and extraction well check valve 90 closes, thereby causing air flow into contaminated zone 55. When ambient air pressure decreases below the well pressures, injection valves 35 close and extraction valve 90 opens, exhausting air.

The orientation of the check valves is the same for both injection valves 35 and extraction valve 90. Namely, gravity pulls a check valve disc down onto a valve seat to close the valve. However, because of the U-tube or goose neck piping 105 on injection wells 15, higher ambient air pressure opens injection valves 35 because the air enters from the "underside", while the air pressure closes extraction valve 90 because it enters from the "topside".

Figure 2:
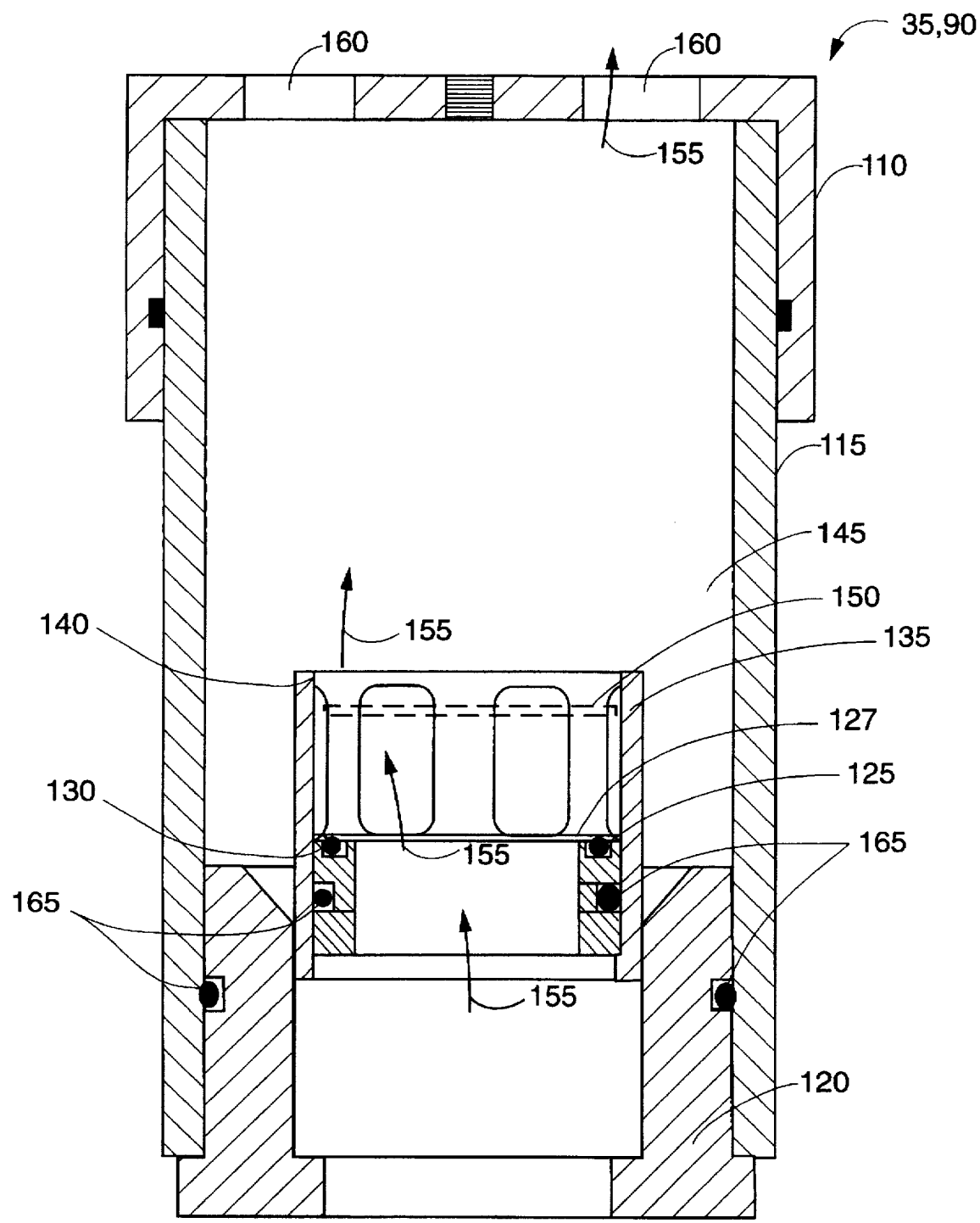
FIG. 2 is a cross-section side elevation view of a lift check valve used in the vapor system.

Referring now to FIG. 2, the details of extraction check valve 90 (or injection lift check valves 35) can be seen in cross section. One drawing depicts both the injection and extraction check valves because they are exactly the same.

Lift check valve 90 (or 35) generally includes a top cover 110, a body 115, and a base 120. Within body 115 is a free floating diaphragm disc 127 resting on diaphragm seat 125. The actual seal of disc 127 occurs at the apex of circular seat O-ring 130. The diaphragm is restrained from side motion by perforated cage 135 and restrained vertically by pins 140. Diaphragm 127 is shown in the closed position. When the pressure within the base 120 and seat 125 areas exceeds the pressure within the body at 145, the diaphragm lifts, typically, to a position at 150 (shown in phantom), allowing air flow as shown by arrows 155. In the case of this valve being check valve 90 in extraction well 20, air 155 exits at apertures 160 in top cover 110 to either outside air or to optional wind turbine 95 (FIG. 1). In the case where this valve is check valve 35 in injection well 15, the exiting air from valve 35 would be into goose neck 150 (FIG.1). O-ring seals 165 provide a seal between the seat 125 and cage 135, and between the base 120 and body 115.

The successful operation of the passive gas-extraction system described here requires that the check valve respond to differential pressures which are as small as possible. Accordingly, this check valve design is constructed so that closure occurs due to gravity, and opens when the differential pressure is very small, i.e. less than about 0.06 millibar. Consequently, the valve requires no external energy source, requires virtually no maintenance, and may be constructed from inexpensive plastic materials. Closure occurs and air flow is prevented when the force of gravity causes free diaphragm 127 to settle across o-ring seal 130 located at the bottom of diaphragm cage 135.

In a preferred embodiment, diaphragm 127 is a circular disk of plastic material having a thickness of about 0.025 inches, and a diameter of about 2 inches. Weight of the diaphragm is about 0.9 to 1.3 grams. Although the dimensions are not critical, but are dictated by choice of materials and application, minimal seal contact of diaphragm 127 with O-ring 130 is critical. Namely, low (slight) differential pressure operation is obtained by the use of O-ring 130 making minimum tangential contact with diaphragm 127. This minimal contact minimizes water surface tension which may develop at the contact point (of the O-ring and diaphragm) and tend to oppose lifting of the diaphragm. This minimal contact allows the valve to operate at differential pressures of less than about 0.06 millibar, in a preferred embodiment, when the valve cross-section area is 1.77 in$^2$. Although O-ring 130 is depicted showing a preferred embodiment, other cross-sectionally shaped rings could similarly be used so long as the contact point with diaphragm 127 is kept minimal.

Figure 3:
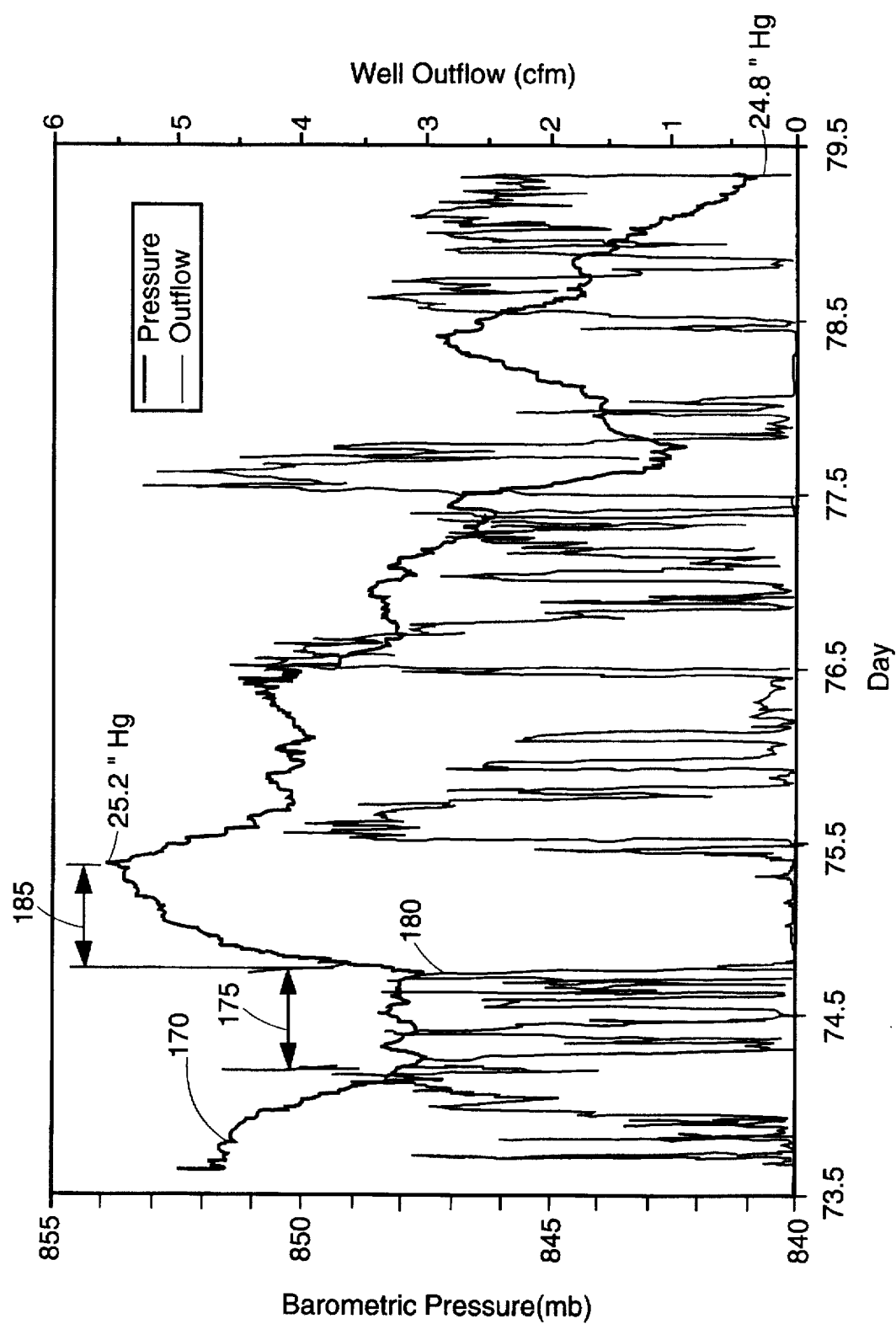
FIG. 3 is a graph of barometric pressure and extraction well outflow vs. time, in days.

FIG. 3 is a graph of barometric pressure and extraction well outflow vs. time (in days) at an actual test site during a six-day time period. The barometric pressure trace 170 illustrates fluctuations between 854 millibar (mb) and 841 mb. This is equivalent to 25.2 in. of mercury (Hg) and 24.8 in. Hg (the reduced pressure due to test site elevation). A careful evaluation of the 14-hour time period around day 74.5 identified at 175, indicates that due to fluctuations of less than one mb, air outflow 180 starts and stops at least eight times, indicating air extraction during eight or more valve cycles during that period. In contrast, during a constant rising barometer period, indicated at 185, the flow is essentially zero, due to extraction valve 90 being closed.

A measure of the total volume of air and gas removed in this six-day period indicated about 12,000 cubic feet were removed. This is a significant volume for a total variation of only 0.4 inches Hg, and without any external energy sources being used. Obviously, during stormy periods and higher winds, this extraction air flow would increase significantly, i.e., by a factor of three or four.

Figure 4:
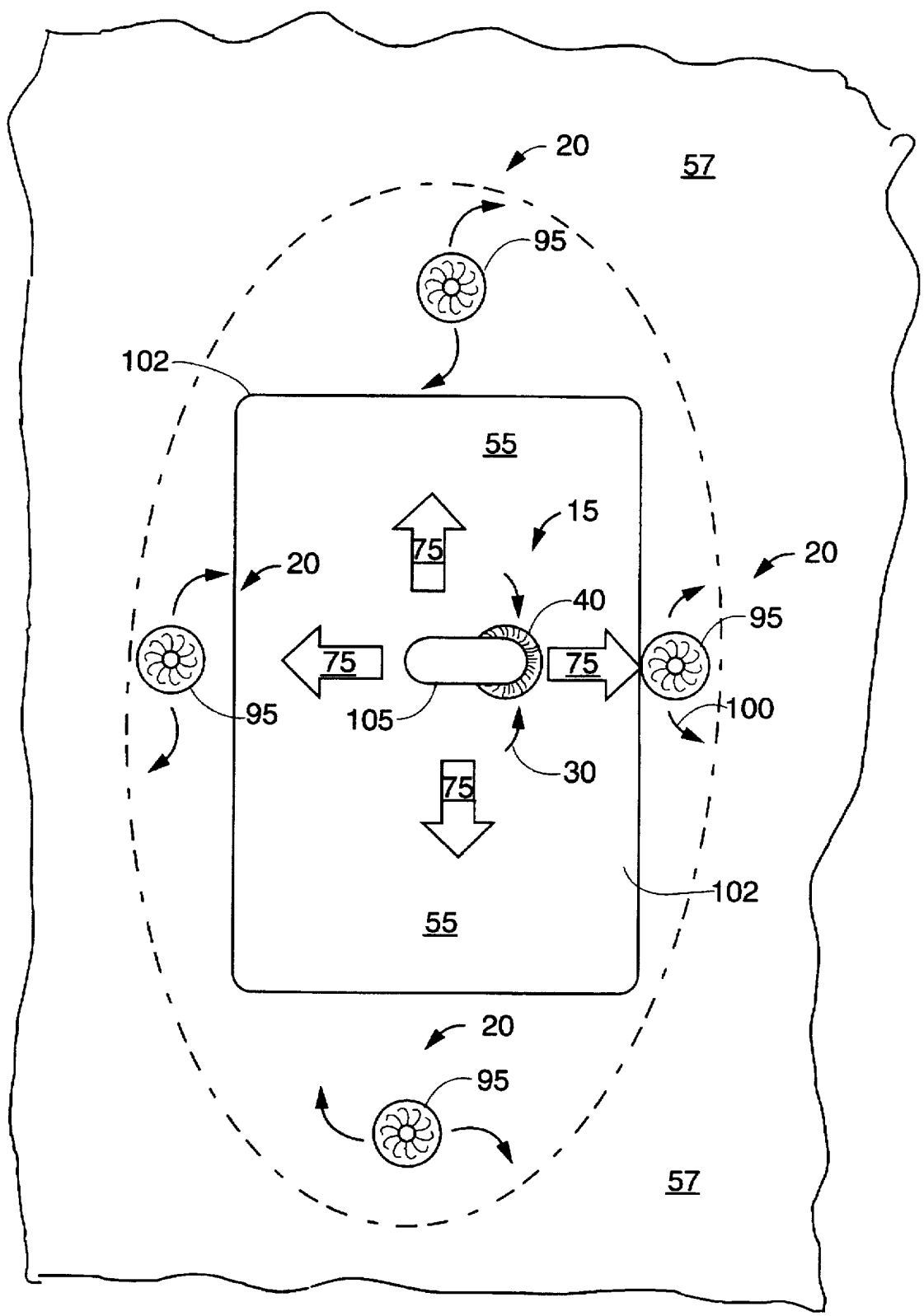
FIG. 4 is a plan view of a second embodiment of the system showing a central injection well within a circle of extraction wells.

Referring now to FIG. 4, an alternate embodiment depicts the present invention system having extraction wells 20 surrounding injection well 15 (in contrast with FIG. 1 where injection wells 15 surround extraction well 20). This configuration may be preferred based on soil and geological conditions in the area. Like elements between FIGS. 1 and 4 are referenced the same.

The tests and descriptions above demonstrate the feasibility and simplicity of the present invention gas vapor extraction system. The system can easily operate over long periods of time to efficiently extract volatile organic compounds from subsurface soils or other ground formations without using any external source of power.

While the present invention has been described by reference to specific embodiments, it will be apparent that other alternative embodiments and methods of implementation or modification may be employed without departing from the true spirit and scope of the invention.

We claim:

1. A system for removal of contaminant soil gas vapors from a ground subsurface by means of barometric pressure changes, the system comprising:
   (a) one or more injection wells in the ground subsurface, each having a check valve which opens and allows air entry to the injection well only when an ambient air pressure exceeds an injection well air pressure; and,
   (b) one or more extraction wells in the ground subsurface, each having a check valve which opens and allows air to exhaust from the extraction well only when the ambient air pressure is exceeded by an extraction well air pressure; wherein ambient air pressure greater than the injection well air pressure causes air to enter the injection well and adjacent ground subsurface, and an ambient air pressure less than the extraction well air pressure causes air and the soil gas vapors to exhaust from the extraction well.

2. The system as recited in claim 1 wherein a single extraction well is surrounded by multiple injection wells.

3. The system as recited in claim 1 wherein a single injection well is surrounded by multiple extraction wells.

4. The system as recited in claim 1 wherein one or more of the injection wells and one or more of the extraction wells have a wind turbine attached to their respective injection and extraction check valves, thereby increasing air flow when each check valve is open.

5. The system as recited in claim 1 wherein each check valve is an ambient air operated, lift check valve.

6. The system as recited in claim 5 wherein the lift check valve opens at a differential pressure of less than about 0.1 millibars.

7. The system as recited in claim 1 wherein each check valve comprises:
   (a) a body;
   (b) a top cap attached to a top body portion;
   (c) a base attached to a lower body portion;
   (d) a cage and diaphragm seat affixed within the base; and,
   (e) a free floating air-actuated diaphragm within the cage, and wherein the diaphragm is held closed in contact with the diaphragm seat by gravity.

8. The system as recited in claim 7 wherein the diaphragm contacts the diaphragm seat with minimum surface area.

9. The system as recited in claim 8 wherein the diaphragm contacts an apex of an O-ring disposed in the diaphragm seat for minimum surface area contact.

10. The system as recited in claim 1 wherein an impermeable barrier is placed over a ground surface adjacent to at least one injection well or at least one extraction well.

11. A system for removal of ground contaminant soil gas vapors from a ground subsurface by means of barometric pressure changes, the system comprising:
   (a) one or more injection wells in the ground subsurface, each well having a lift check valve which opens and allows air entry to the injection well only when an ambient air pressure exceeds an injection well air pressure; and,
   (b) one or more extraction wells in the ground subsurface, each having a lift check valve which opens and allows air to exhaust from the extraction well only when the ambient air pressure is exceeded by an extraction well air pressure; wherein an ambient air pressure greater than the injection and extraction well air pressure causes air to enter the injection well and adjacent ground subsurface, and an ambient air pressure less than the injection and extraction well air pressure causes air and the soil gas vapors to exhaust from the extraction well, and wherein said lift check valves open at a differential pressure of less than about 0.6 millibar.

12. The system as recited in claim 11 wherein a single extraction well is surrounded by multiple injection wells.

13. The system as recited in claim 11 wherein a single injection well is surrounded by multiple extraction wells.

14. The system as recited in claim 11 wherein one or more of the injection wells and one or more of the extraction wells have a wind turbine attached to their respective injection and extraction check valves, thereby increasing air flow when each check valve is open.

15. The system as recited in claim 11 wherein each lift check valve comprises:
   (a) a body;
   (b) a top cap attached to a top body portion;
   (c) a base attached to a lower body portion;
   (d) a cage and diaphragm seat affixed within the base; and,
   (e) a free floating air-actuated diaphragm within the cage held closed in contact with the diaphragm seat by gravity, and wherein the diaphragm is actuated to an open position by a differential pressure of less than 0.6 millibars.

16. A system for removal of contaminant soil gas vapors from a ground subsurface by means of barometric pressure changes, the system comprising one or more extraction wells in the ground subsurface, each having a check valve which opens and allows air to exhaust from the extraction well only when the ambient air pressure is exceeded by an extraction well air pressure and an ambient air pressure less than the extraction well air pressure causes air and the soil gas vapors to exhaust from the extraction well.

17. The system as recited in claim 16 wherein each check valve is an ambient air operated, lift check valve.

18. The system as recited in claim 17 wherein the lift check valve opens at a differential pressure of less than about 0.1 millibars.

19. The system as recited in claim 16 wherein each check valve comprises:
   (a) a body;
   (b) a top cap attached to a top body portion;
   (c) a base attached to a lower body portion;
   (d) a cage and diaphragm seat affixed within the base; and,
   (e) a free floating air-actuated diaphragm within the cage, and wherein the diaphragm is held closed in contact with the diaphragm seat by gravity.

20. The system as recited in claim 19 wherein the diaphragm contacts the diaphragm seat with minimum surface area contact.

21. The system as recited in claim 20 wherein the diaphragm contacts an apex of an O-ring disposed in the diaphragm seat for minimum surface area contact.

* * * * *